US012681837B2

(12) United States Patent (10) Patent No.: US 12,681,837 B2

Geckeler (45) Date of Patent: Jul. 14, 2026

(54) INTELLIGENT TEST PLAN GENERATION AND EXECUTION

(71) Applicant: SAP SE, Walldorf (DE)

(72) Inventor: Florian Geckeler, Neustadt an der Weinstrasse (DE)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 18/527,084

(22) Filed: Dec. 1, 2023

(65) Prior Publication Data

US 2025/0181482 A1 Jun. 5, 2025

(51) Int. Cl.
*G06F 11/362* (2025.01)

(52) U.S. Cl.
CPC ................................. *G06F 11/3624* (2013.01)

(58) Field of Classification Search
CPC ... G06F 30/20; G06F 8/71; G06F 8/36; G06F 16/11; G06F 8/30
See application file for complete search history.

(56) References Cited

U.S. PATENT DOCUMENTS

| | | | |
|---|---|---|---|
| 10,922,214 B1* | 2/2021 | Nadein ............... | G06F 11/3624 |
| 2025/0165226 A1* | 5/2025 | Roper, Jr. ............. | G06N 3/105 |
| 2025/0217114 A1* | 7/2025 | Roper, Jr. ............. | G06N 20/00 |

* cited by examiner

*Primary Examiner* — Chuck O Kendall
(74) *Attorney, Agent, or Firm* — SCHWEGMAN LUNDBERG & WOESSNER, P.A.

(57) ABSTRACT

Example methods and systems are directed to automatically generating and executing intelligent test plans. When a file containing source code for an application is changed, an intelligent test plan is generated that selects a subset of the available tests for the application. A dependency graph may be generated that shows which other files depend on the modified file, directly or indirectly. By running the tests for the modified file and all files that depend on the modified file, without running all tests for the application, errors introduced by the changes to the modified file can be detected while reducing the time taken to run tests.

20 Claims, 10 Drawing Sheets

310

```
CODE1.C

INT ADD(INT A, INT B) {
    RETURN A + B;
}
```

320

```
CODE1.H

INT ADD(INT A, INT B);
```

330

```
CODE2.C

#INCLUDE "CODE1.H"

INT ADD_TWICE(INT A, INT B) {
  RETURN 2 * ADD(A, B);
}
```

| DEPENDENCY TABLE | | | |
|---|---|---|---|
| PROJECT NAME | FILE | VER | DEPENDENT |
| APP1 | CODE1 | 1.1 | CODE2 |
| APP1 | CODE1 | 1.1 | CODE3 |
| APP1 | CODE2 | 1.1 | CODE4 |

410
420
430A
430B
430C

| TEST TABLE | |
|---|---|
| FILE | TEST |
| CODE1 | CODE1.TEST |
| CODE2 | CODE2.TEST |
| CODE3 | CODE3.TEST |
| CODE4 | CODE4.TEST |

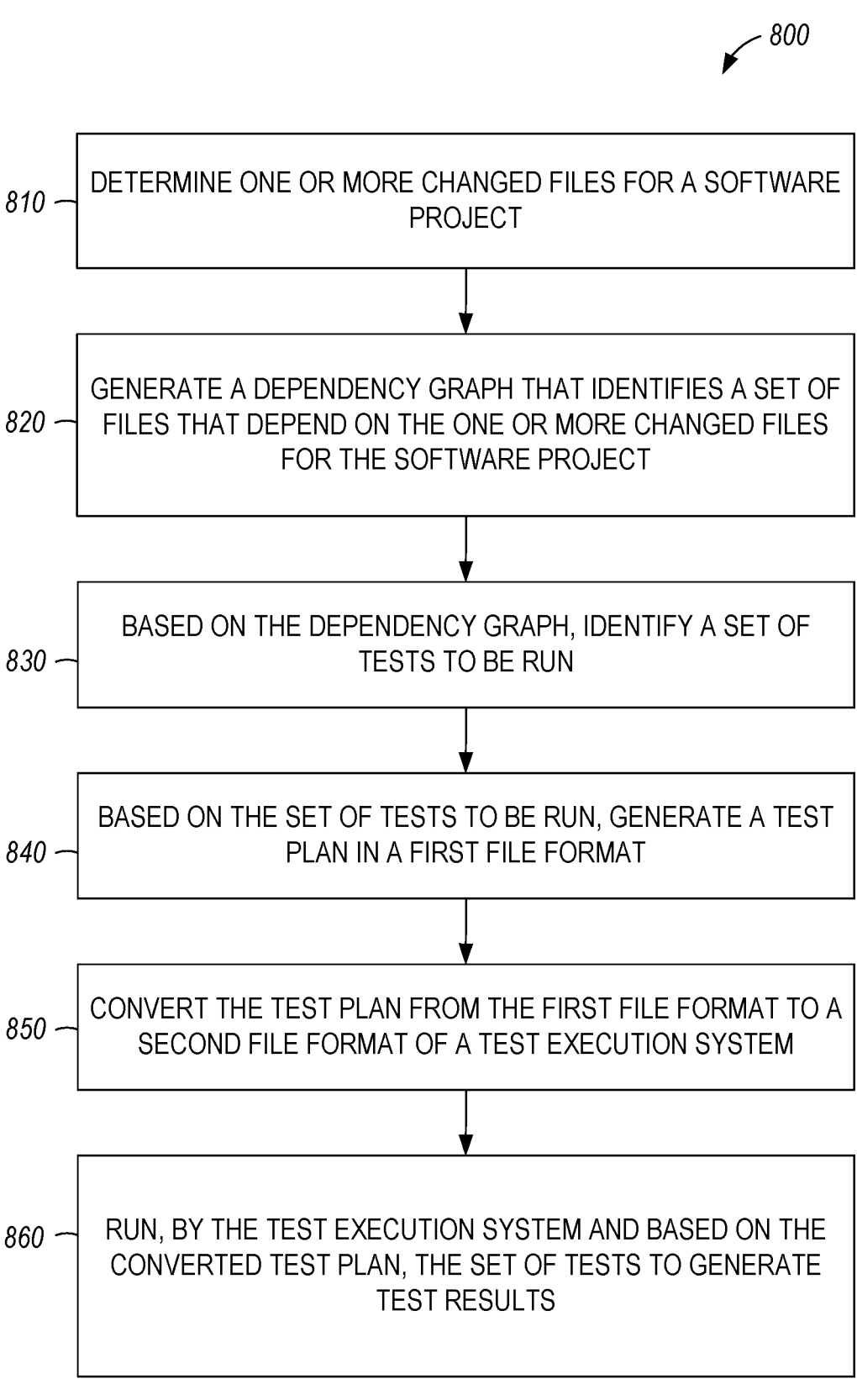

*800*

810 — DETERMINE ONE OR MORE CHANGED FILES FOR A SOFTWARE PROJECT

820 — GENERATE A DEPENDENCY GRAPH THAT IDENTIFIES A SET OF FILES THAT DEPEND ON THE ONE OR MORE CHANGED FILES FOR THE SOFTWARE PROJECT

830 — BASED ON THE DEPENDENCY GRAPH, IDENTIFY A SET OF TESTS TO BE RUN

840 — BASED ON THE SET OF TESTS TO BE RUN, GENERATE A TEST PLAN IN A FIRST FILE FORMAT

850 — CONVERT THE TEST PLAN FROM THE FIRST FILE FORMAT TO A SECOND FILE FORMAT OF A TEST EXECUTION SYSTEM

860 — RUN, BY THE TEST EXECUTION SYSTEM AND BASED ON THE CONVERTED TEST PLAN, THE SET OF TESTS TO GENERATE TEST RESULTS

*FIG. 8*

INTELLIGENT TEST PLAN GENERATION AND EXECUTION

TECHNICAL FIELD

The subject matter disclosed herein generally relates to generating and executing test plans for software projects. Specifically, the present disclosure addresses systems and methods to automatically identify and test portions of software projects that are affected by modifications.

BACKGROUND

Modern software is comprised of thousands of files. In compiled programming languages, these files are compiled into machine-readable bytecode. Dependencies, such as libraries, may be kept in separate files and referenced by the bytecode. In interpreted languages, the files are not compiled but rather are interpreted by an interpreter in order to run the software. One file "depends" on another if a change in the other file affects the functionality of the first file.

Systems that automatically build and test software are called Continuous Integration Systems (CIS). Examples of CIS include Jenkins™, TektonCD™, and CircleCI™. Systems that manage changes of source code over time are called Version Control Systems (VCS). Examples of VCS include git and the Revision Control System (RCS).

To verify the functionality of software, developers create tests for their code. These tests can range from low-level function tests to comprehensive end-to-end test scenarios. Due to dependencies between different files, merely testing a low-level function, or even all functions in a single file, does not ensure that modifying a function in one file has not introduced an error that is not detected by the test for that function but causes a function in another file to fail.

Software developers may use VCS to manage changes to files and CIS to test those changes. A test execution system can execute an entire suite of tests for a software project each time a change is made. As a software project expands, the number of tests increases and the time to execute the suite of tests increases. As a result, the feedback cycle for developers slows, decreasing their productivity.

BRIEF DESCRIPTION OF THE DRAWINGS

FIG. 3 is an illustration of files with dependencies, according to some example environments.

FIG. 4 is a block diagram illustrating a database schema suitable for use by a change analyzer, according to some example embodiments.

FIG. 8 is a flowchart illustrating operations of an example method suitable for intelligent test plan generation and execution.

DETAILED DESCRIPTION

Example methods and systems are directed to automatically generating and executing intelligent test plans. When a file containing source code for an application is changed, current systems either execute only tests for the file or else execute all tests for the application. If only tests for the file are executed, source code in other files that makes use of the modified functionality goes untested. As a result, a change may introduce errors that would have been detected if all tests had been run, but go undetected. If all tests for the application are executed, then any detectable errors will be found. However, for applications with large test suites, the time taken to execute the tests may be substantial (e.g., greater than 24 hours). As a result, developer productivity is lost.

As discussed herein, when a file containing source code for an application is changed, an intelligent test plan is generated that selects a subset of the available tests for the application. A dependency graph may be generated that shows which other files depend on the modified file, directly or indirectly. One file depends on another if a change in the other file affects the functioning of the first file. For example, if a file such as "math.py" defines the function "add(x,y)" as "return x+y," another file can make use of the add( ) function by importing "math.py." Then, if the "math.py" file is changed to define "add(x,y)" as "return x-y," the results generated by other functions that make use of the add( ) function may be changed unexpectedly. By running the tests for the modified file and all files that depend on the modified file, without running all tests for the application, errors introduced by the changes to the modified file can be detected while reducing the time taken to run tests.

Using the systems and methods described herein, efforts involved in developing and testing applications is reduced. By ensuring that needed tests are run and extraneous tests are not run, the efficiency of test servers and software developers is improved.

Figure 1:
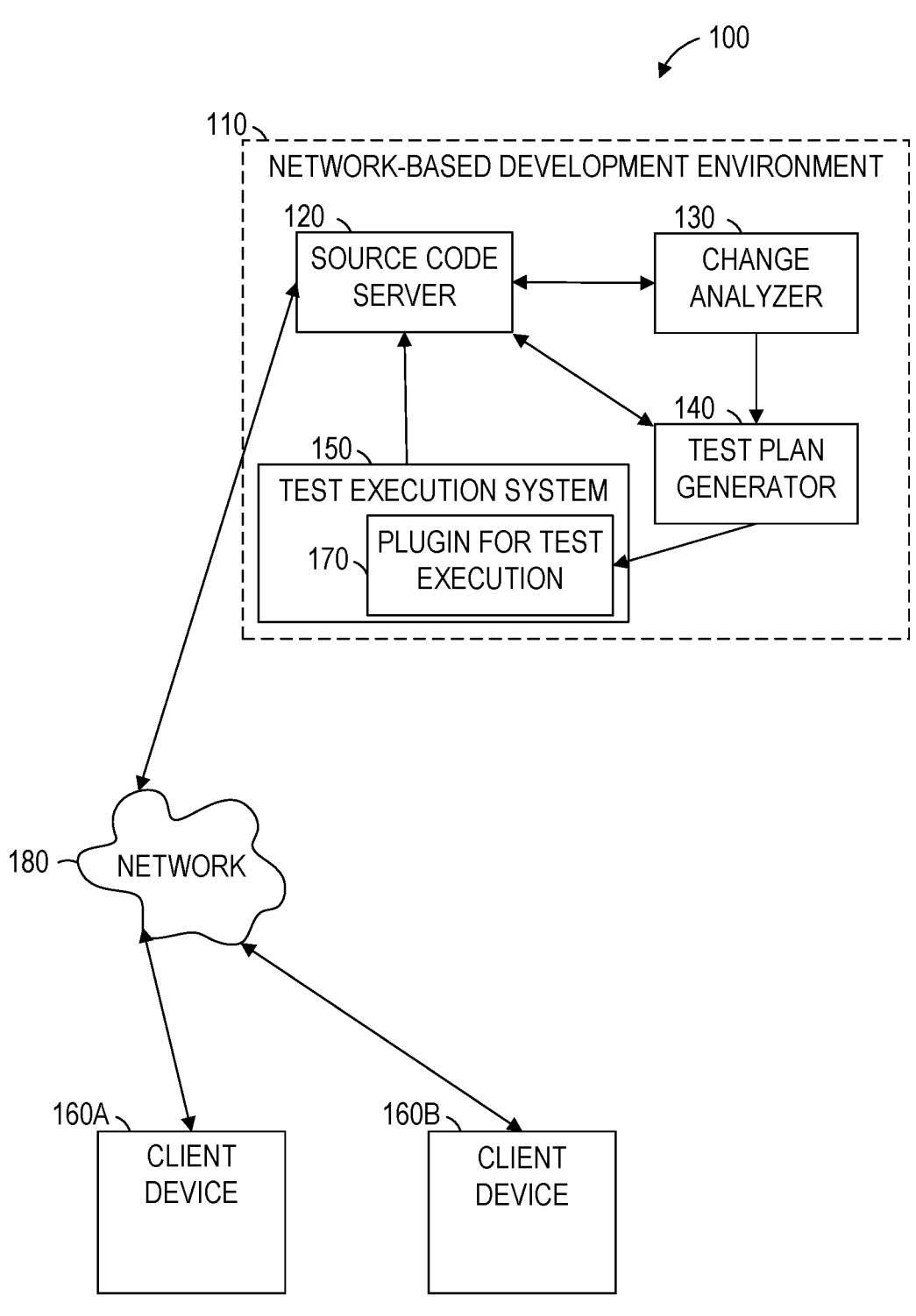
FIG. 1 is a network diagram illustrating an example network environment suitable for intelligent test plan generation and execution.

FIG. 1 is a network diagram illustrating an example network environment 100 suitable for intelligent test plan generation and execution. The network environment 100 includes the network-based development environment 110, client devices 160A and 160B, and a network 180. The network-based development environment 110 includes a source code server 120, a change analyzer 130, a test plan generator 140, and a test execution system 150.

Application developers use client devices 160A and 160B to upload source code changes for the application to the source code server 120. The source code server 120 may provide a VCS, such as git.

When changes are uploaded to the source code server 120, the source code server notifies the change analyzer 130 (e.g., via an application programming interface (API) call). In response, the change analyzer 130 downloads the changes from the source code server 120. The change analyzer 130 determines which files were changed and all files that depend on the changed files. A list of the changed files and their dependencies is provided by the change analyzer 130 to the test plan generator 140.

The test plan generator 140 generates an intelligent test plan. The intelligent test plan may include tests for a plurality of source code files for the application, while including tests for fewer than all source code files for the application. For example, the test plan generator 140 may determine a set of tests for the list of files received from the change analyzer 130. Additionally, the test plan generator 140 may receive configuration data from the source code server 120. The configuration data may identify one or more additional tests to be run. The test plan generator 140 provides the set of tests, in a machine-readable format, to a plugin 170, which causes the test execution system 150 to execute the tests and generate test results. The test execution system 150, which may be a CIS, provides the test results to the source code server 120, which may provide the results to the developer that uploaded the changes.

The source code server 120, the change analyzer 130, the test plan generator 140, the test execution system 150, and the client devices 160A and 160B may each be implemented in a computer system, in whole or in part, as described below with respect to FIG. 10. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The source code server 120, the change analyzer 130, test plan generator 140, the test execution system 150, and the client devices 160A-160B are connected by the network 180. The network 180 may be any network that enables communication between or among machines, databases, and devices. Accordingly, the network 180 may be a wired network, a wireless network (e.g., a mobile or cellular network), or any suitable combination thereof. The network 180 may include one or more portions that constitute a private network, a public network (e.g., the Internet), or any suitable combination thereof.

Though FIG. 1 shows only one or two of each element (e.g., one source code server 120, two client devices 160A and 160B, and the like), any number of each element is contemplated. For example, the source code server 120 may be one of dozens or hundreds of active and standby servers and provide services to millions of client devices. Likewise, the test plan generator 140 may provide test plans to a variety of different test execution systems 150, and so on.

Figure 2:
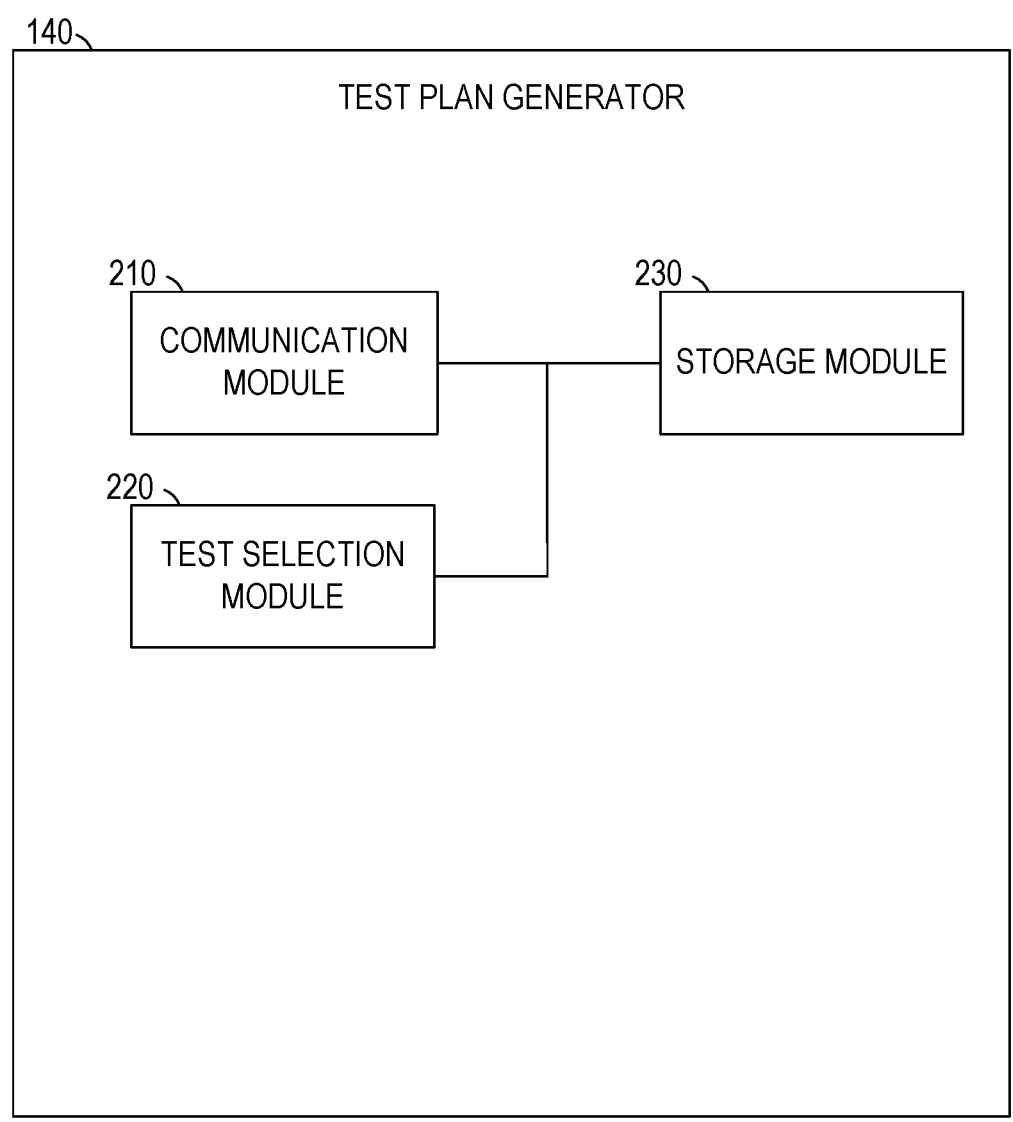
FIG. 2 is a block diagram of a test plan generator, suitable for intelligent test plan generation, according to some example embodiments.

FIG. 2 is a block diagram 200 of the test plan generator 140, suitable for intelligent test plan generation and execution, according to some example embodiments. The test plan generator 140 is shown as including a communication module 210, a test selection module 220, and a storage module 230, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the test plan generator 140 and transmits data from the test plan generator 140. For example, the communication module 210 may receive, from the source code server 120, an identifier (e.g., a file name) of a source code file that was modified by a developer. The source code file may be one of many that comprise the source code for an application. As another example, the communication module 210 may send notifications to the source code server 120 that a test for the modified version of the source code file failed or passed.

The test selection module 220 selects tests to include in an intelligent test plan based on changes to one or more source code files for an application. For example, the test selection module 220 may generate or access a dependency graph that identifies all files that are directly or indirectly affected by changes to a source file. All tests for all files in the dependency graph may be added to the intelligent test plan. In some example embodiments, one or more additional tests may also be included in the intelligent test plan. For example, an administrator may edit a configuration file to identify a comprehensive test to be run as part of every intelligent test plan.

Source code, tests, configuration files, or any suitable combination thereof may be stored and accessed by the storage module 230. For example, local storage of the test plan generator 140, such as a hard drive, may be used. As another example, network storage may be accessed by the storage module 230 via the network 180.

FIG. 3 is an illustration of files with dependencies, according to some example environments. The file 310, titled "code1.c" includes source code that provides application functionality. In this example, the file 310 provides an ADD function that returns the sum of two numbers. The file 320, titled "code1.h" provides function definitions for the functions defined in the file 310. The file 330, titled "code2.c" provides an ADD_TWICE function that returns twice the sum of two numbers. The ADD_TWICE function is implemented using the ADD function. To access the ADD function even though it is defined in a different file, the file 330 includes the file 320, as shown by the "#include" statement. This allows development tools (such as compilers, interpreters, and linkers) to correctly handle the function call.

If the ADD function in the file 310 is changed, this change will also affect the functioning of the ADD_TWICE function. Accordingly, when a change in the file 310 is detected, tests for the functions in the file 310 and tests for the functions in all files that make use of the functions in the file 310 should be run. The change analyzer 130 can determine which files depend on the changed file by searching each source code file for an include directive. In this example, the file 330 depends on the file 310.

The process of determining dependencies may be repeated. For example, since the results of ADD_TWICE would change if the ADD function were changed, another source file that uses ADD_TWICE is also affected by a change to ADD. As a result, tests for that other source file should also be run.

FIG. 4 is a block diagram illustrating a database schema 400 suitable for use by the change analyzer 130, according to some example embodiments. The database schema 400 includes a dependency table 410 and a test table 440. The dependency table 410 includes rows 430A, 430B, and 430C of a format 420. The test table 440 includes rows 460A, 460B, 460C, and 460D of a format 450. Though FIG. 4 shows only a few rows in each table and only a few tables, more rows and tables are contemplated. For example, the development server 130 of FIG. 1 may store source code and tests for dozens, hundreds, or thousands of applications, each of which would have one or more corresponding rows in each of the tables of FIG. 4. Additional columns or tables may be used to store additional information, such as an owner of each project, contact information for project owners to notify if tests fail, servers to which projects are deployed, and the like.

The dependency table 410 stores, as indicated by the format 420, a project name, a file name, a version, and a dependent name. Each time the source code server 120 notifies the change analyzer 130 that a file has changed, the changed file may be processed to update its dependency information. For example, an include statement may be added or removed from the file, resulting in a row being added to or removed from the dependency table 410. Dependency information for multiple versions of the files may be stored in the dependency table 410, distinguished from each other by the value of the version field. For example, the first time a file is committed, it may be given the version 1.0. Each successive commit may be given a higher version number, such as 1.1, 1.2, and so on. Using a VCS, a developer may be able to access older versions of files by specifying the version to retrieve. If a new bug in code is found, various versions of the software application can be tested to determine which version introduced the bug, enhancing developers' ability to find the erroneous code and fix the bug.

In some example embodiments, the source code server 120 notifies the change analyzer 130 that one or more files have changed. In response, the change analyzer 130 retrieves stored dependency information for the changed files from the dependency table 410. The change analyzer 130 analyzes the changed files to determine current dependency information for the changed files (e.g., by detecting include statements). Any differences between the current dependency information and the stored dependency information are resolved by updating the data in the dependency table 410, for the current version of the files.

Each of the rows 430A-430C are for files in the project APP1. The rows 430A-430B indicate that the file CODE1 is dependent on the files CODE2 and CODE3. The row 430C indicates that the file CODE2 is dependent on the file CODE4. The test selection module 220 of FIG. 2 may use the dependency table 410 to determine which source code files are affected, directly or indirectly, by changes to a file. For example, if changes are made to the file CODE2, the row 430A informs the change analyzer 130 that functions defined in the file CODE1 may also be affected by the change. As another example, if changes are made in the file CODE4, the row 430C indicates that functions defined in the file CODE2 may be directly affected by the change. Additionally, since the row 430A indicates that the file CODE1 is dependent on the file CODE2, functions defined in the file CODE1 may be indirectly affected by the change.

The change analyzer 130 may use the test table 440 to identify the tests to be added to an intelligent test plan based on which file was modified and the information in the dependency table 410. As shown by the format 450, each row of the test table 440 includes a source code file name and a test (or test file) name. In this example, the test for each source code file is stored in a file with a similar name and the .TEST extension. Thus, continuing with the example above, when the test selection module 220 determines that the tests for CODE4, CODE2, and CODE1 should be run, the test table 440 is used to determine that those tests are CODE4.TEST, CODE2.TEST, and CODE1.TEST.

As with the dependency table 410, the test table 440 may include version information for the source code file, the test file, or both. For example, version 1.1 of CODE1 may be associated with version 1.2 of CODE1.TEST. Alternatively, a single version number may be used for both the source code file and the corresponding test file.

Figure 5:
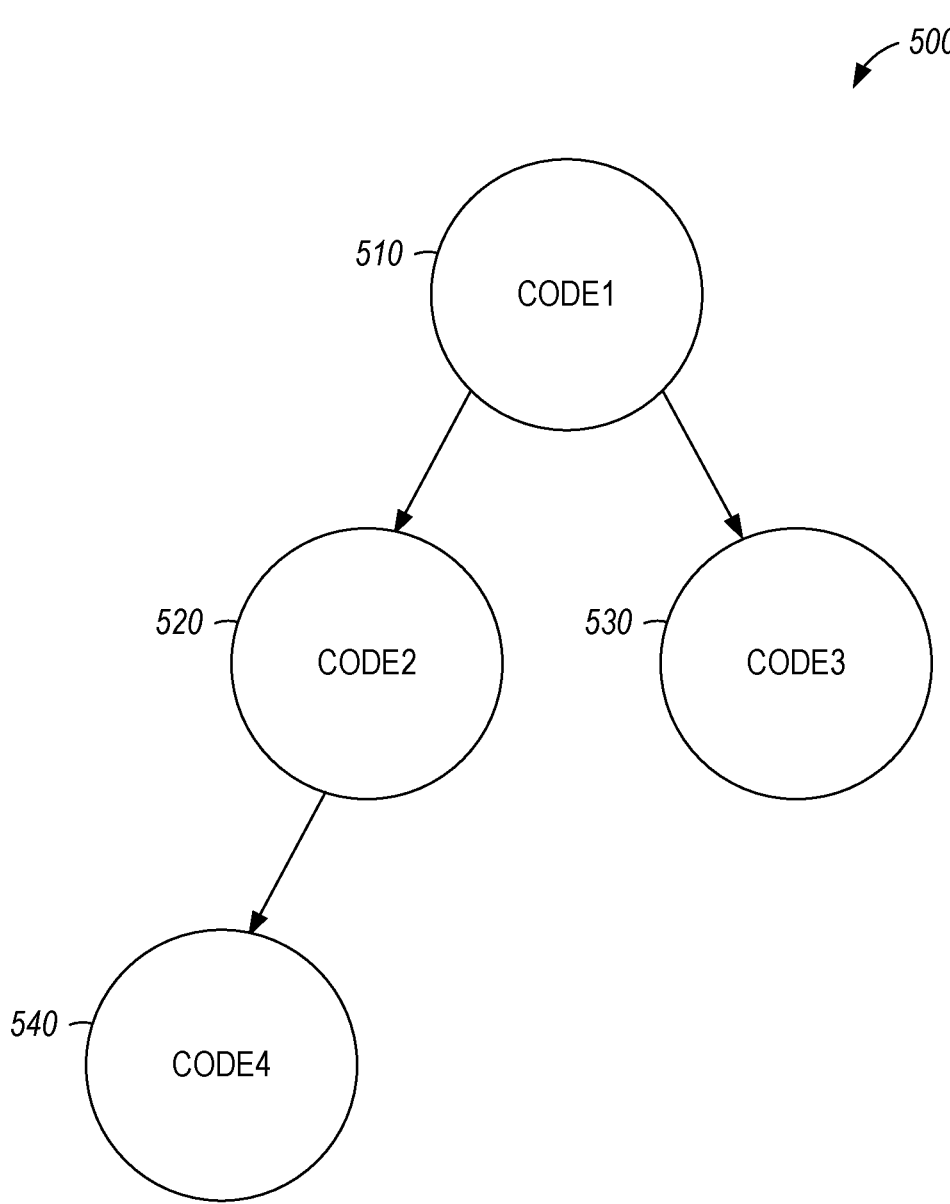
FIG. 5 is a block diagram illustrating a dependency graph suitable for use in intelligent test plan generation and execution, according to some example embodiments.

FIG. 5 is a block diagram illustrating a dependency graph 500 suitable for use in intelligent test plan generation and execution, according to some example embodiments. The dependency graph 500 includes nodes 510, 520, 530, and 540. Each node 510-540 may be represented by a data structure such as:

```
structure node {
    string filename;
    node* parent;
}
```

In this example structure, each node comprises a filename and a pointer to a parent node structure. The pointer to the parent is NULL if the node has no parent. The dependency graph 500 may be built by repeatedly referencing the dependency table 410. For example, if a change is made to the file CODE1, the dependency graph 500 is initialized with the node 510, which has no parent. The dependency table 410 is searched to identify other source files that are dependent on CODE1. For each source file so identified, a data structure is created for that source file, with the parent pointing to the node 510. Thus, the nodes 520 and 530 are created.

The process is then repeated for the new (second) level of the dependency graph 500. The dependency table 410 is searched to identify other source files that are dependent on CODE2 and CODE3, with new nodes created accordingly. In this example, the node 540 for CODE4 is created. Since at least one new node was created, the process repeats for the new (third) level of the dependency graph 500. Since the dependency table 410 does not show any dependencies on CODE4, no child nodes of the node 540 are created. No nodes were created in the next (fourth) level of the dependency graph 500, so the dependency graph building process is complete. By reference to the source files identified by the dependency graph 500 and the test files identified by the test table 440, the test selection module 220 of FIG. 2 is enabled to select the test files corresponding to the source files that are, directly or indirectly, affected by a modification to one source file.

Alternatively, the dependency graph 500 may be built by repeatedly searching the text of the source code files. For example, if a change is made to the file 310 of FIG. 3, the root node 510 is created in the dependency graph 500 for the file 310. Then, each other source file can be searched for the text:

include "code1.h"

A child node of the node for the file 310 is created for each source file that includes the file 320. After all child nodes of the root node 510 are created (e.g., the child nodes 520 and 530), the source files are searched again, this time for the text:

include "code2.h"

Child nodes of the node 520 are created for each matching source file (e.g., the node 540). This process is repeated until no new nodes are generated. To avoid circular graphs, source files that are already represented by nodes in the dependency graph 500 may not be searched again.

Figure 6:
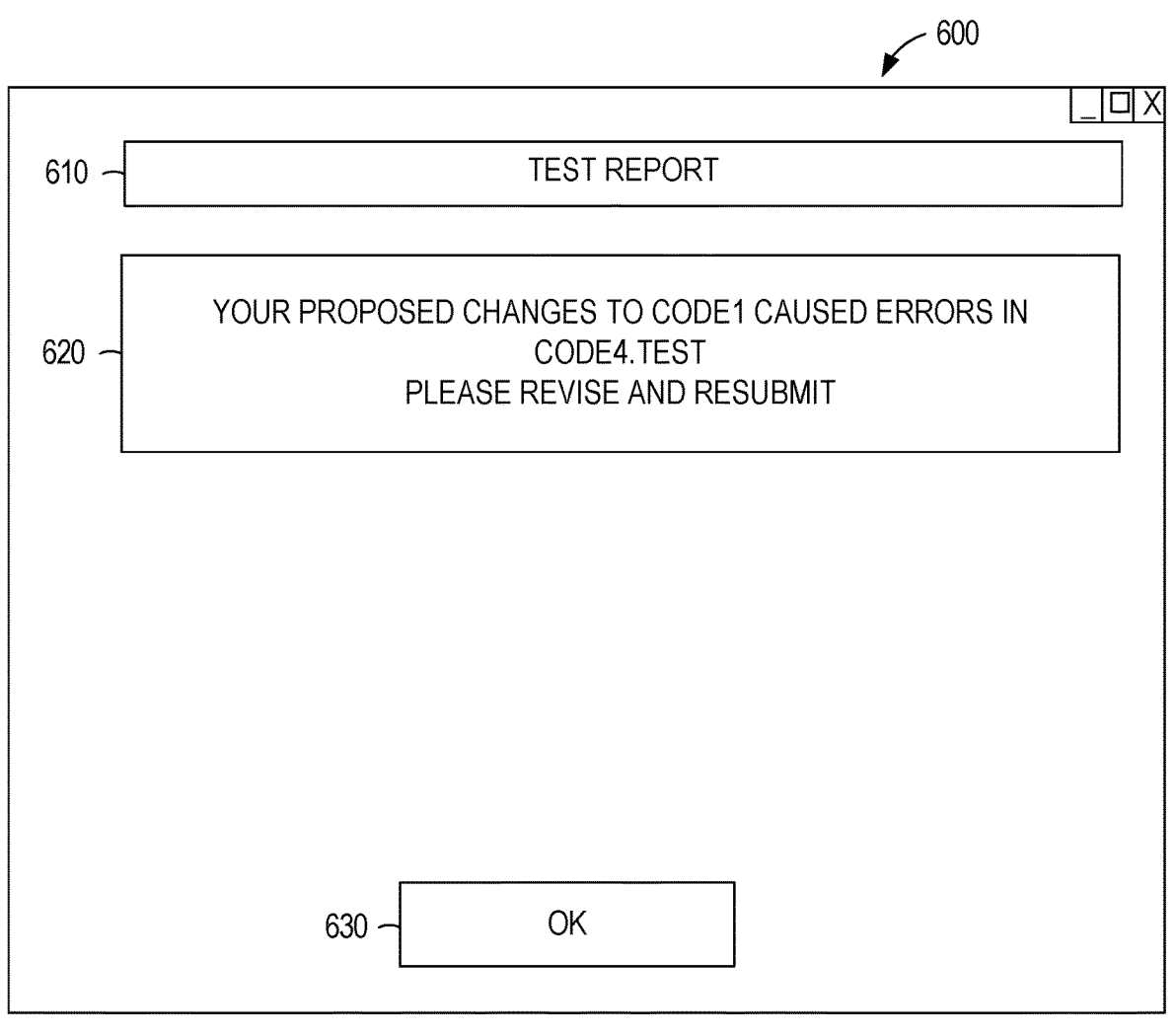
FIG. 6 is a block diagram illustrating a user interface for informing a user of errors detected by executing an intelligent test plan, according to some example embodiments.

FIG. 6 is a block diagram illustrating a user interface 600 for informing a user of errors detected by executing an intelligent test plan, according to some example embodiments. The user interface 600 may be presented to a developer using the client device (160A or 160B) of FIG. 1 to attempt to commit changes to a source code file. The user interface 600 includes a title 610, an informational message 620, and a button 630.

The title 610 indicates that the user interface 600 reports test results. As indicated by the informational message 620, the changes in the source code file CODE1 caused errors in the test file CODE4.TEST. The developer is invited to revise the source code and repeat the commit attempt. The button 630 enables the user to dismiss the user interface 600.

Figure 7:
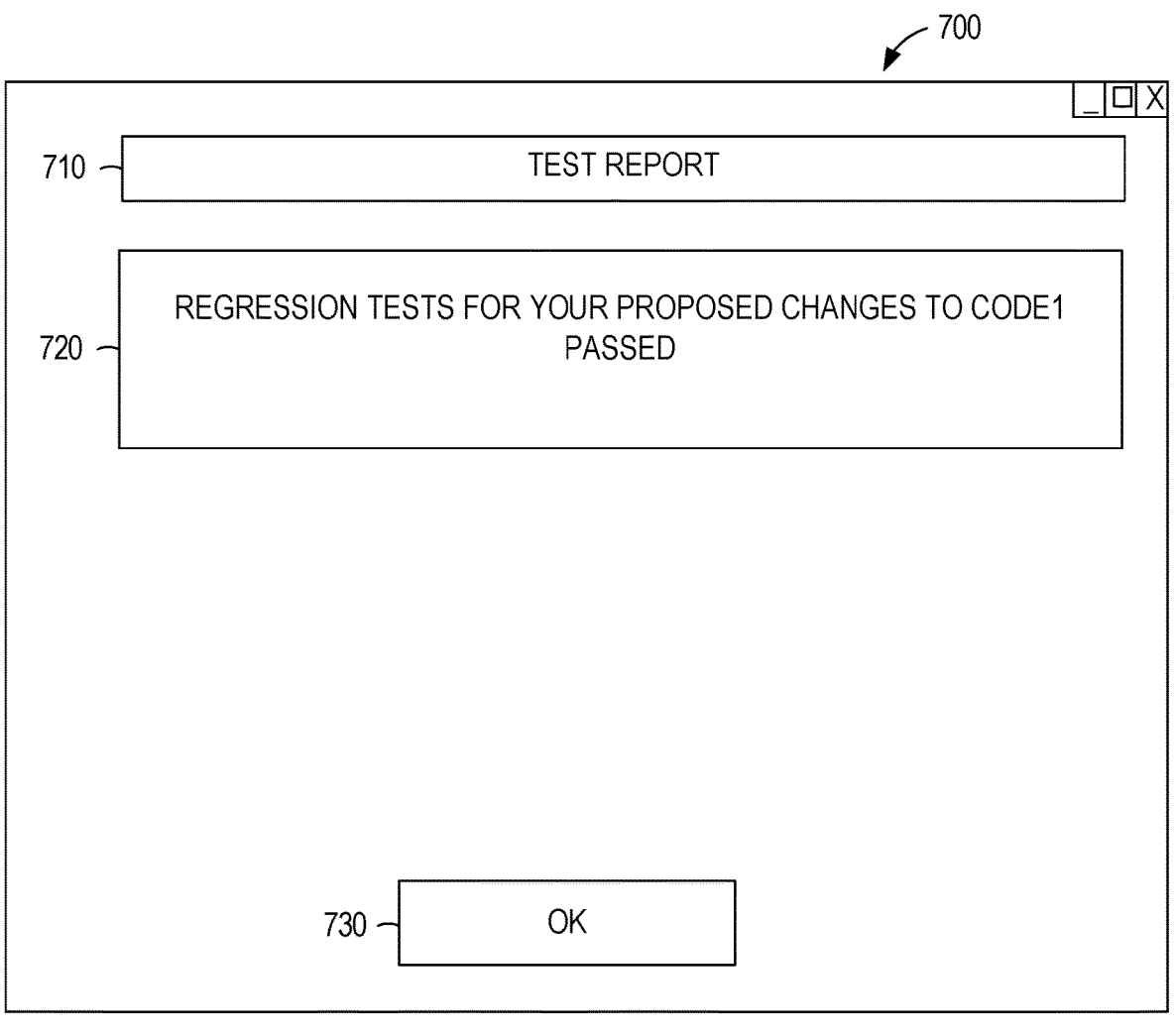
FIG. 7 is a block diagram illustrating a user interface for informing a user of that all tests of an intelligent test plan have passed, according to some example embodiments.

FIG. 7 is a block diagram illustrating a user interface 700 for informing a user that all tests of an intelligent test plan have passed, according to some example embodiments. The user interface 700 may be presented to a developer using the client device 160A of FIG. 1 to attempt to commit changes to a source code file. The user interface 700 includes a title 710, an informational message 720, and a button 730.

The title 710 indicates that the user interface 700 reports test results. As indicated by the informational message 720, the changes in the source code file CODE1 did not cause any test errors.

FIG. 8 is a flowchart illustrating operations of an example method 800 suitable for intelligent test plan generation and execution. The method 800 includes operations 810, 820, 830, 840, 850, and 860. By way of example and not limitation, the method 800 is described as being performed by the change analyzer 130, the test plan generator 140, the test execution system 150, and the plugin for test execution 170, all of FIG. 1, using the modules 210-260 of FIG. 2 and the database schema 400 of FIG. 4.

The change analyzer 130, in operation 810, determines one or more changed files for a software project. For example, a developer using the client device 160A may have uploaded changed files (e.g., using a commit command of a VCS) to the source code server 120. The change analyzer 130 either requests information from the source code server 120 that identifies the changed files or retrieves the files for the software project and compares them to stored versions to determine which files have changed.

In operation 820, the test selection module 220 of the test plan generator 140 generates a dependency graph that identifies a set of files that depend on the one or more changed files for the software project. In some example embodiments, the generating of the dependency graph comprises determining which files import the file containing the change. This may be accomplished by searching the files for the software project to determine if they contain the name of the changed file. Such files are affected by the changed file. The search process may be repeated to build the dependency graph 500. For example, if the file "example.cpp" was modified, files containing "include example.cpp" or "include example.h" are affected by the change.

In other example embodiments, the dependency table 410 may be used to generate the dependency graph 500 of FIG. 5. For example, if the file CODE1 was modified in version 1.1, a root node is created for CODE1 and the dependency data from the rows 430A and 430B is read to determine that CODE2 and CODE3 depend on CODE1. Child nodes in the dependency graph are created for the files that depend on the changed file. The database search process may be repeated to build the dependency graph 500. For example, after adding a child node for CODE2, the dependency data from the row 430C is read to determine that CODE4 depends on CODE2, so a node for CODE4 is added to the dependency graph 500.

A developer may commit changes to multiple files at once. Accordingly, the dependency graph generated in operation 820 may identify files that are affected by changes in multiple files for the software project. Thus, a single dependency graph may be generated that identifies all files affected by changes in multiple files.

Based on the dependency graph, the test selection module 220 identifies a set of tests to be run (operation 830). For example, the test table 440 may be used to determine the tests to run for each file in the generated dependency graph. As another example, test definition files may be searched to determine if they refer to files in the generated dependency graph (e.g., by importing or including the source code files identified by the dependency graph). Thus, the identifying of the set of tests to be run may comprise identifying a set of tests that refer to the set of files identified in the dependency graph.

The set of tests may further include one or more tests that are run regardless of the files identified by the dependency graph. For example, a global configuration file, a project-specific configuration file, or both, may be accessed by the test selection module 220. Before running the set of tests, the test selection module 220 adds the one or more tests identified by the one or more configuration files to the set of tests.

Based on the set of tests to be run, the test plan generator 140 generates a test plan in a first file format (operation 840). For example, the test plan may be generated in a machine-readable file format that is parseable by the plugin for test execution 170. The first file format may be a common file format that is used by different plugins for a variety of test execution systems. The test plan generator 140 may send the test plan in the first file format to the plugin for test execution 170 via a network (e.g., using an API call).

In operation 850, the plugin for test execution 170 converts the test plan from the first file format to a second file format of a test execution system. Different test execution systems may use different file formats for test plans. Accordingly, different plugins for test execution can receive the test plan in the first file format and generate test plans in different second file formats for the particular test execution system being used. For example, the first file format may be an extended markup language (XML) file format that includes an element for each test; the second file format may be a Python script that, when executed, runs the tests and aggregates the results. In these example embodiments, the running of the set of tests comprises running the set of tests by the test execution system using the converted test plan.

The test execution system 150, in operation 860, runs the set of tests to generate test results. For example, each test may generate a Boolean result that indicates whether the test passed or failed. As another example, each test may generate an integer result wherein a zero indicates success and a non-zero value indicates a particular error code.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: determining one or more changed files for a software project; generating a dependency graph that identifies a set of files that depend on the one or more changed files for the software project; based on the dependency graph, identifying a set of tests to be run; based on the set of tests to be run, generating a test plan in a first file format; converting the test plan from the first file format to a second file format of a test execution system; and running the set of tests by the test execution system based on the converted test plan to generate test results.

In Example 2, the subject matter of Example 1, wherein the operations further comprise: accessing a configuration file that identifies a test; and before running the set of tests, adding the identified test to the set of tests.

In Example 3, the subject matter of Examples 1-2, wherein the generating of the dependency graph comprises determining which source code files for the software project import the one or more changed files.

In Example 4, the subject matter of Examples 1-3, wherein the converting of the test plan from the first file format to the second file format of the test execution system is performed by a plugin for the test execution system.

In Example 5, the subject matter of Examples 1-4, wherein the identifying of the set of tests to be run comprises identifying a set of tests that refer to the set of files identified in the dependency graph.

In Example 6, the subject matter of Examples 1-5, wherein the generating of the dependency graph comprises generating a root node for each of the one or more changed files.

In Example 7, the subject matter of Examples 1-6, wherein the determining of the one or more changed files for the software project comprises receiving a notification from a version control system (VCS).

Example 8 is a non-transitory computer-readable medium that stores instructions that, when executed by one or more processors, cause the one or more processors to perform operations comprising: determining one or more changed files for a software project; generating a dependency graph that identifies a set of files that depend on the one or more changed files for the software project; based on the dependency graph, identifying a set of tests to be run; and running the set of tests to generate test results.

In Example 9, the subject matter of Example 8, wherein the operations further comprise: accessing a configuration file that identifies a test; and before running the set of tests, adding the identified test to the set of tests.

In Example 10, the subject matter of Examples 8-9, wherein the generating of the dependency graph comprises determining which source code files for the software project import the one or more changed files.

In Example 11, the subject matter of Examples 8-10, wherein the converting of the test plan from the first file format to the second file format of the test execution system is performed by a plugin for the test execution system.

In Example 12, the subject matter of Examples 8-11, wherein the identifying of the set of tests to be run comprises identifying a set of tests that refer to the set of files identified in the dependency graph.

In Example 13, the subject matter of Examples 8-12 includes wherein the generating of the dependency graph comprises generating a root node for each of the one or more changed files.

In Example 14, the subject matter of Examples 8-13, wherein the determining of the one or more changed files for the software project comprises receiving a notification from a version control system (VCS).

Example 15 is a method comprising: determining, by one or more processors, one or more changed files for a software project; generating a dependency graph that identifies a set of files that depend on the one or more changed files for the software project; based on the dependency graph, identifying a set of tests to be run; and running the set of tests to generate test results.

In Example 16, the subject matter of Example 15 includes accessing a configuration file that identifies a test; and before running the set of tests, adding the identified test to the set of tests.

In Example 17, the subject matter of Examples 15-16, wherein the generating of the dependency graph comprises determining which source code files for the software project import the one or more changed files.

In Example 18, the subject matter of Examples 15-17, wherein the converting of the test plan from the first file format to the second file format of the test execution system is performed by a plugin for the test execution system.

In Example 19, the subject matter of Examples 15-18, wherein the generating of the dependency graph comprises generating a root node for each of the one or more changed files.

In Example 20, the subject matter of Examples 15-19, wherein the determining of the one or more changed files for the software project comprises receiving a notification from a version control system (VCS).

Example 21 is an apparatus comprising means to implement any of Examples 1-20.

Figure 9:
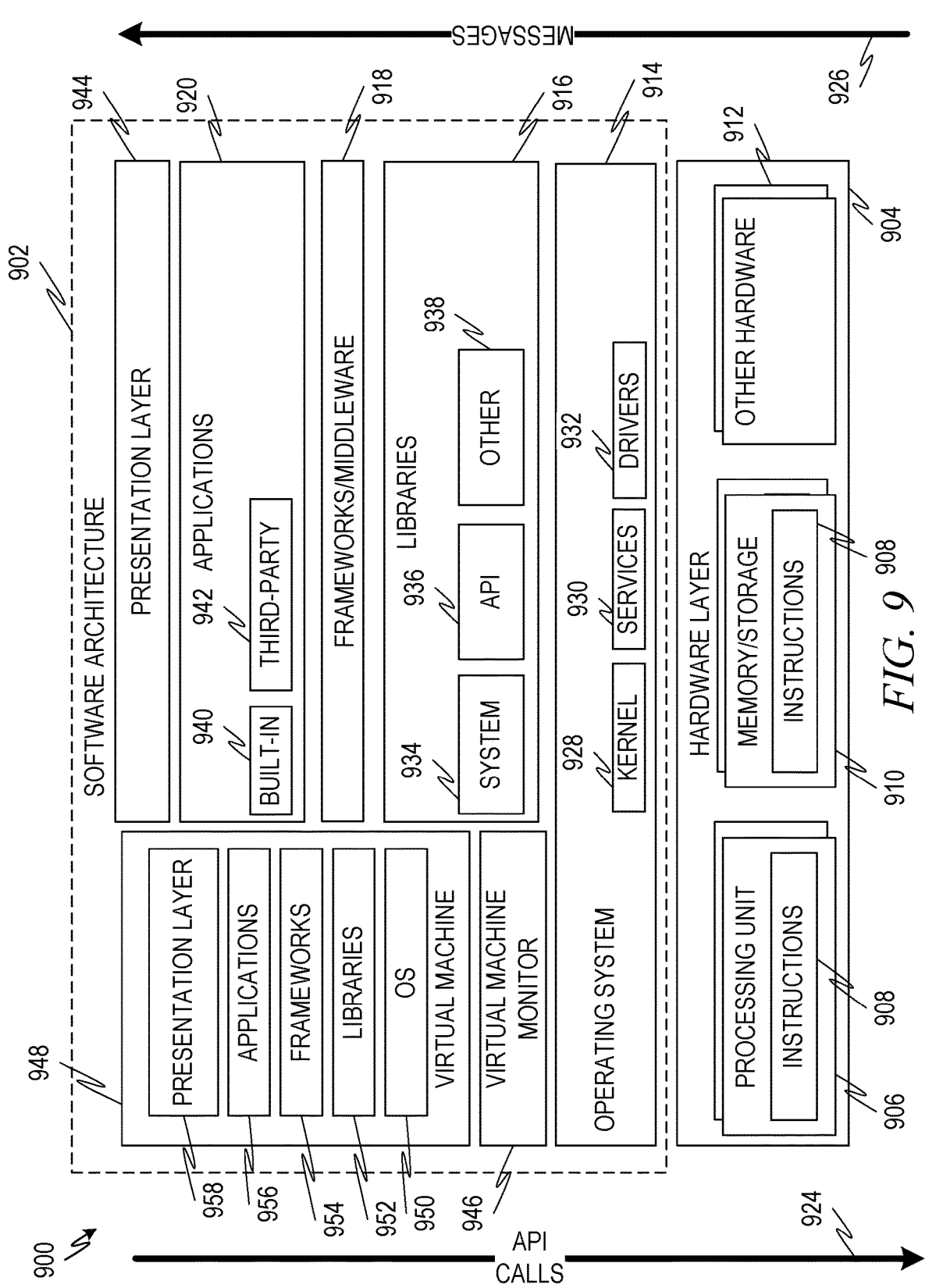
FIG. 9 is a block diagram showing one example of a software architecture for a computing device.

FIG. 9 is a block diagram 900 showing one example of a software architecture 902 for a computing device. The software architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 10:
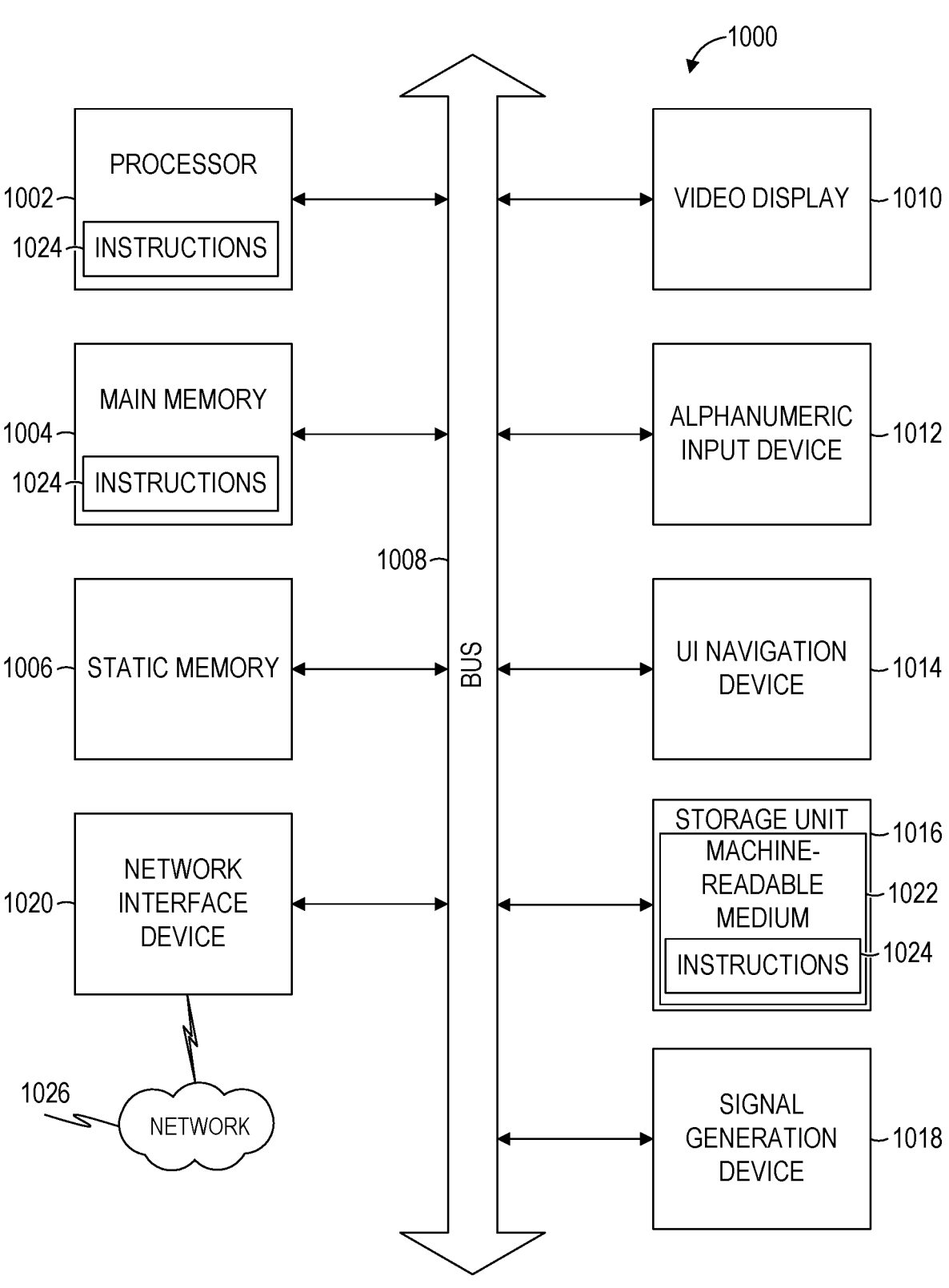
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting a machine-readable medium 1022.

While the machine-readable medium 1022 is shown in FIG. 10 to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

a memory that stores instructions; and one or more processors coupled to the memory and configured to execute the instructions to perform operations comprising:

determining one or more changed files for a software project;

generating a dependency graph that identifies a set of files that depend on the one or more changed files for the software project;

based on the dependency graph, identifying a set of tests to be run, the set of tests comprising tests for the set of files and excluding at least one test for the software project;

based on the set of tests to be run, generating a test plan in a first file format;

converting the test plan from the first file format to a second file format of a test execution system; and running the set of tests by the test execution system based on the converted test plan to generate test results.

2. The system of claim 1, wherein the operations further comprise:

accessing a configuration file that identifies a test; and before running the set of tests, adding the identified test to the set of tests.

3. The system of claim 1, wherein the generating of the dependency graph comprises determining which source code files for the software project import the one or more changed files.

4. The system of claim 1, wherein the converting of the test plan from the first file format to the second file format of the test execution system is performed by a plugin for the test execution system.

5. The system of claim 1, wherein the identifying of the set of tests to be run comprises identifying a set of tests that refer to the set of files identified in the dependency graph.

6. The system of claim 1, wherein the generating of the dependency graph comprises generating a root node for each of the one or more changed files.

7. The system of claim 1, wherein the determining of the one or more changed files for the software project comprises receiving a notification from a version control system (VCS).

8. A non-transitory computer-readable medium that stores instructions that, when executed by one or more processors, cause the one or more processors to perform operations comprising:

determining one or more changed files for a software project;

generating a dependency graph that identifies a set of files that depend on the one or more changed files for the software project;

based on the dependency graph, identifying a set of tests to be run, the set of tests comprising tests for the set of files and excluding at least one test for the software project; and running the set of tests to generate test results.

9. The non-transitory computer-readable medium of claim 8, wherein the operations further comprise:

accessing a configuration file that identifies a test; and before running the set of tests, adding the identified test to the set of tests.

10. The non-transitory computer-readable medium of claim 8, wherein the generating of the dependency graph comprises determining which source code files for the software project import the one or more changed files.

11. The non-transitory computer-readable medium of claim 8, wherein the operations further comprise converting a test plan from a first file format to a second file format of a test execution system by a plugin for the test execution system.

12. The non-transitory computer-readable medium of claim 8, wherein the identifying of the set of tests to be run comprises identifying a set of tests that refer to the set of files identified in the dependency graph.

13. The non-transitory computer-readable medium of claim 8, wherein the generating of the dependency graph comprises generating a root node for each of the one or more changed files.

14. The non-transitory computer-readable medium of claim 8, wherein the determining of the one or more changed files for the software project comprises receiving a notification from a version control system (VCS).

15. A method comprising:

determining, by one or more processors, one or more changed files for a software project;

generating a dependency graph that identifies a set of files that depend on the one or more changed files for the software project;

based on the dependency graph, identifying a set of tests to be run, the set of tests comprising tests for the set of files and excluding at least one test for the software project; and running the set of tests to generate test results.

16. The method of claim 15, further comprising:

accessing a configuration file that identifies a test; and before running the set of tests, adding the identified test to the set of tests.

17. The method of claim 15, wherein the generating of the dependency graph comprises determining which source code files for the software project import the one or more changed files.

18. The method of claim 15, further comprising converting a test plan from a first file format to a second file format of a test execution system by a plugin for the test execution system.

19. The method of claim 15, wherein the generating of the dependency graph comprises generating a root node for each of the one or more changed files.

20. The method of claim 15, wherein the determining of the one or more changed files for the software project comprises receiving a notification from a version control system (VCS).

* * * * *